United States Patent Office 3,767,778
Patented Oct. 23, 1973

3,767,778
PROCESS FOR THE PRODUCTION OF
HYDROGEN PEROXIDE
Gunter Giesselmann, Heusenstamm, Gerd Schreyer,
Grossauheim, and Wolfgang Weigert, Offenbach (Main),
Germany, assignors to Deutsche Gold- und Silber-
Scheideanstalt vormals Roessler, Frankfurt am Main,
Germany
No Drawing. Filed Apr. 12, 1971, Ser. No. 133,390
Claims priority, application Germany, Apr. 18, 1970,
P 20 18 686.1
Int. Cl. C01b 15/02; C07c 49/68
U.S. Cl. 423—588         17 Claims

ABSTRACT OF THE DISCLOSURE

Hydrogen peroxide is prepared by the anthraquinone process using a tetrasubstituted urea as a solvent for the reaction carrier.

The present invention is concerned with a process for the production of hydrogen peroxide according to the known anthraquinone process by the use of a new type of solvent in order to obtain a high solubility of the substituted anthraquinones formed in the hydrogenation step and at the same time to produce a high yield of hydrogen peroxide after the oxidation.

As is known in the anthraquinone process an alkyl anthraquinone as the reaction carrier is dissolved in a solvent or a mixture of solvents and in the presence of a catalyst is hydrogenated to such an extent that at least 50% of the quinone is converted to the corresponding hydroquinone. In the oxidation step the hydroquinone solution is treated with an oxygen containing gas whereby the quinone is reformed and hydrogen peroxide is formed simultaneously. The hydrogen peroxide is removed from the organic phase by extracting with water or by strip distillation with organic solvents. The alkyl anthraquinone is then returned to the hydrogenation step and the cyclic process repeated.

For the production of the maximum hydrogen peroxide yield there must be found either solvents or solvent mixtures for the reaction carrier which not only are good solvents for the quinone, but also and/or will dissolve the hydroquinone formed in the hydrogenation step, or there are used anthraquinone derivatives which, conditioned by the structural changes of the anthraquinone molecule are easily soluble.

As the last mentioned anthraquinone derivatives, for example, there can be used alkyl anthraquinones such as 2-tert. butyl anthraquinone, 2-amyl anthraquinone, 2-methyl anthraquinone, 2-ethyl anthraquinone, 2-butyl anthraquinone, 2-isopropyl anthraquinone, 2-sec. butyl anthraquinone, 2-sec. amyl anthraquinone, 1,3-diäthyl anthraquinone, 2,3-dimethyl anthraquinone, 1,4-dimethyl anthraquinone, 2,7-dimethyl anthraquinone, tetrahydro-anthraquinones such as 2-ethyl tetrahydroanthraquinone such as 2-ethyl tetrahydroanthraquinone, mixtures such as a mixture of isopropyl anthraquinone and sec. butyl anthraquinone, eutectic mixtures of anthraquinones, esters of anthraquinone carboxylic acids and hetero nuclear disubstituted alkyl anthraquinones.

The group of solvents which preferably dissolve anthraquinone derivatives and/or anthrahydroquinones are collected in Table I. The entire disclosure of these German patents and auslegeschrifts is incorporated by reference.

TABLE I

| German Patent or Auslege-schrift | Quinone solvent | Hydroquinone solvent |
|---|---|---|
| 1,052,371 | $C_8$–$C_{17}$ ketones xylene | $C_5$–$C_{12}$ alcohols. |
| 671,318 | Anisole | Heptyl alcohol. |
| 963,150 | Benzene | Methyl cyclohexyl acetate. |
| 953,790 | Alkyl benzene | Do. |
| 933,088 | Benzene | Do. |
| 888,840 | Methyl naphthalene | Diisobutyl carbinol. |
| 1,019,280 | do | Phosphoric acid esters. |
| 1,112,051 | t-Butyl toluene | Diisobutyl carbinol. |
| 1,106,737 | Xylene | Do. |
| 1,261,838 | Alkyl benzene | Phosphoric acid esters. |
| 834,094 | Benzene | Do. |

Among the ketones which can be so used are ketones of the formula

where R is methyl and $R_1$ is a cyclic group, e.g., acetophenone, 1-phenyl-2-propanone and acetonaphthone.

As aromatic hydrocarbons (including the preferred alkyl benzenes) so used, there are included tetramethyl benzene, trimethyl benzene, alkyl benzene mixtures boiling at 200–220° C., or 158–186° C., or 205–220° C., or 184–202° C., or 205–320° C., t-butyl benzene, t-butyl toluene, ethyl propyl benzene, isodurene, toluene, xylene, benzene, 1,3-diethyl benzene, 1,4-diethyl benzene, dimethyl naphthalene.

In industrial operation there are used mostly working solutions whose individual components consist of a specific solvent for the quinone and hydroquinone, which are mixed in a fixed proportion. However, hard requirements are placed on the working solution during duty.

(1) The working solution for the production of economical hydrogen peroxide concentration must have as a high as possible dissolving power for the quinone and for the hydroquinone after the hydrogenation.

(2) The working solution is not permitted to be irreversibly changed either in the hydrogenation or oxidation step.

(3) The working solution must be resistant to hydrogen peroxide.

(4) The working solution must be resistant to water.

(5) Decomposition products which occur must be easily regeneratable or removable or not disturb the process.

(6) At the isolation of the hydrogen peroxide by extraction the density of the working solution must differentiate sufficiently from that of the water and the aqueous hydrogen peroxide solution.

Further requirements are added for operational safety, as, for example, the highest possible boiling point (ignition point), low viscosity, etc.

It has now been found that unsymmetrical and symmetrical tetra substituted ureas of the following structure

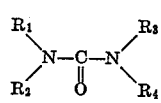

are outstanding hydroquinone and/or quinone solvents and can be used either as pure solvents or in admixture with the quinone solvents named in Table I for the production of hydrogen peroxide. The substitution possibilities of the individual ureas are set forth below.

$R_1$ is alkyl of 1 to 12 carbon atoms, i.e., methyl to dodecyl, preferably, 1 to 5, or more preferably, 1 to 3 carbon atoms, which, in a given case can be substituted by one or more $OR_5$ groups where $R_5$ is hydrogen or alkyl of 1 to 12 carbon atoms, preferably 1 to 3 carbon atoms where the $OR_5$ group can be in the middle or at the end of the alkyl chain named under R.

$R_1$ can also be cycloalkyl having 5 or 6 ring carbon atoms which, in a given case can be substituted by one or more alkyl groups with 1 to 5 carbon atoms and/or one or more $OR_5$ groups.

$R_1$ can be an aralkyl group in which the alkyl group can have 1 to 5 carbon atoms and the aromatic ring itself, in a given case can be substituted by alkyl groups with 1 to 5 carbon atoms and/or $OR_5$ groups.

$R_2$ can be as defined for $R_1$, and $R_1$ and $R_2$ can be either identical or not identical.

$R_1$ and $R_2$ can be joined together to form a 5 or 6 atom ring system, in a given case interrupted by a hetero atom such as N, O, S or P.

$R_3$ can be as defined for $R_2$ and can be the same or different.

$R_4$ can be as defined for $R_2$ and can be the same or different.

$R_3$ and $R_4$ can be joined as defined for $R_1$ and $R_2$.

Examples of suitable substituted ureas include

Tetramethyl urea $$\begin{array}{c} CH_3 \quad O \quad CH_3 \\ | \quad\; || \quad\; | \\ N—C—N \\ | \quad\quad\; | \\ CH_3 \quad\; CH_3 \end{array}$$

N,N-diethyl-N',N'-di-n-butyl urea $$\begin{array}{c} C_2H_5 \quad O \quad C_4H_9 \\ | \quad\; || \quad\; | \\ N—C—N \\ | \quad\quad\; | \\ C_2H_5 \quad\; C_4H_9 \end{array}$$

N,N-dimethyl-N',N'-methyl-3-methoxy-n-propyl urea $$\begin{array}{c} O \quad CH_3 \\ || \quad\; | \\ CH_3OCH_2CH_2CH_2—N—C—N \\ | \quad\quad\; | \\ CH_3 \quad\; CH_3 \end{array}$$

N,N-dimethyl-N',N'-methyl-2,3,5 or 6 methyl-4-methoxy-1-cyclohexyl urea $$\begin{array}{c} CH_3 \qquad\qquad O \quad CH_3 \\ \quad\qquad\qquad\qquad || \quad\; | \\ CH_3O—\langle H \rangle—N—C—N \\ \qquad\qquad\qquad\; | \quad\quad\; | \\ \qquad\qquad\qquad CH_3 \quad\; CH_3 \end{array}$$

N,N-dimethyl-carbamoyl-N'-morpholine $$\begin{array}{c} CH_2CH_2 \qquad O \quad CH_3 \\ / \qquad\quad\backslash \quad || \quad\; | \\ O \qquad\qquad N—C—N \\ \backslash \qquad\quad / \qquad\qquad | \\ CH_2CH_2 \qquad\quad\;\; CH_3 \end{array}$$

Other suitable tetrasubstituted ureas include tetraethyl urea, tetrapropyl urea, tetraisopropyl urea, N,N',N'-trimethyl-N-ethyl urea, N,N'-dimethyl - N,N'-di(dodecyl) urea, N-methoxyethyl-N-methyl - N',N' - diethyl urea, N-amyloxymethyl - N,N',N' - trimethyl urea, N,N-dipropoxypropyl, N',N'-diethyl urea, N,N'-dimethyl, N,N'-diamyl urea, tetracyclohexyl urea, N,N',N'-trimethyl, N-cyclohexyl urea, N,N'-diethyl, N,N'-di(4-methylcyclohexyl) urea, N,N-diethyl carbamoyl piperidine, carbodimorpholine $$\begin{array}{c} CH_2CH_2 \qquad O \qquad CH_2CH_2 \\ / \qquad\quad\backslash \quad || \quad\; / \qquad\quad\backslash \\ O \qquad\qquad N—C—N \qquad\qquad O \\ \backslash \qquad\quad / \qquad\qquad \backslash \qquad\quad / \\ CH_2CH_2 \qquad\qquad\quad CH_2CH_2 \end{array}$$

N'N'-dimethyl carbamoyl - N' - thiomorpholine, N,N-diethyl carbamoyl-N'-oxazolidine.

Of the low molecular weight ureas tetramethyl urea and N,N-dimethyl-N',N'-diethyl urea, for example, are completely miscible with water and are used for working solutions from which the hydrogen peroxide formed can be removed by a stripping distillation by the processes of German application P 18 02 003.6 and P 19 51 211.9 and the corresponding United States application, Schreyer et al. application 856,070, filed Sept. 8, 1969, and now abandoned and the continuation-in-part thereof, Schreyer et al. application, Ser. No. 79,315 entitled "Producing Nonaqueous Hydrogen Peroxide Solutions" filed Oct. 8, 1970 now Pat. 3,707,444. The entire disclosure of the Schreyer et al. application filed Oct. 8, 1970, is hereby incorporated by reference.

Thus the stripping distillation is preferably carried out at pressures between 5 and 60 torr and temperatures between 30 and 110° C., although pressure of 3 to 100 torr and temperatures of 20 to 120° C. can be used.

For stripping there can be used carboxylic acids, esters, alcohols and ethers having 4 to 10, preferably 4 to 8 carbon atoms and ketones having 3 to 7 carbon atoms. Thus there can be used carboxylic acids such as formic acid, acetic acid, propionic acid, butyric acid, isobutyric acid, privalic acid, esters such as ethyl acetate, propyl acetate, butyl acetate, allylacetate, propyl formate, butyl formate, isobutyl acetate, t-butyl acetate, amyl acetate, isoamyl acetate, methyl propionate, ethyl propionate, methyl butyrate, ethyl butyrate, methyl valerate, methyl isovalerate, isopropyl acetate, 2-ethylbutyl acetate, sec. hexyl acetate, propyl propionate, isopropyl propionate, butyl propionate, isobutyl propionate, amyl propionate, propyl butyrate, isobutyl butyrate, methyl isobutyrate, ethyl isobutyrate, propyl isobutyrate, isopropyl isobutyrate, isobutyl isobutyrate, amyl isobutyrate, ethyl valerate, methyl isovalerate, propyl isovalerate, methyl caproate, alcohols such as propanol, butanol, isobutyl alcohol, amyl alcohol, hexyl alcohol, cyclohexanol, esters of pivalic acid, 2,2-dimethylpentanoic acid, neodecanoic acid, neotridecanoic acid and 2,2,4,4-tetramethyl valeric acid, e.g., lower alkyl esters of pivalic acid such as methyl pivalate, ethyl pivalate, propyl pivalate, isopropyl pivalate, butyl pivalate, sec. butyl pivalate, amyl pivalate and hexyl pivalate. There also can be used, for example, methyl neodecanoate, ethyl neodecanoate, methyl neotridecanoate, the methyl ester of 2,2-dimethyl valeric acid and the ethyl ester of 2,2-diethyl butyric acid.

There can also be used allyl acetate as well as esters of cycloalipahtic alcohols such as cyclohexyl acetate, cyclohexyl butyrate, cyclohexyl pivalate, cyclohexyl formate, methyl cyclohexyl acetate and cyclopentyl acetate.

Additionally there can be used as stripping agents mixtures of carboxylic acids, esters, ketones or hydrocarbon fractions boiling up to 160° C. Illustrative of such a mixture is 60% acetic acid and 40% di-n-propyl ether.

Besides there can be used aliphatic ethers with 4–10 carbon atoms such as diethylether, dipropylether, diisopropyl ether, dibutyl ether, diisobutyl ether, di sec. butyl ether, diamyl ether, di-isoamyl ether, ethyl propyl ether, propyl butyl ether, ethylene glycol dimethyl ether, propylene glycol dimethyl ether, methyl ethyl ether of ethylene glycol, methyl ethyl ether of propylene glycol.

Also there can be used aliphatic ketones with 3–7 carbon atoms, for example, acetone, methyl ethyl ketone, methyl isobutyl ketone, cyclohexanone, di-isopropyl ketone.

Additional examples of mixtures of stripping agents include, for example, acetic acid and di-n-propyl ether, acetic acid and methyl ethyl ethyleneglycol ether, di-isopropyl ether and t-butyl acetate, di-isopropyl ether t-butyl acetate- and benzene, acetic acid and n-butyl acetate, acetone and benzene, propionic acid and propyl propionate, propyl acetate and acetic acid, propyl acetate and propanol. For example, in each of the two and three component mixtures just mentioned there can be used equal parts by volume of each component of the mixture.

The higher molecular weight ureas on the contrary are only of limited solubility in water or are not soluble in water.

The low density of 0.8 to 0.95 of numerous tetrasubstituted ureas favors an extraction of hydrogen peroxide with water.

For both methods of operation, N,N-diethyl, N',N'-di-n-butyl urea is especially suitable. On account of its slight solubility in water and low density it is suitable for working solutions from which the hydrogen peroxide is to be extracted with water and on account of its high boiling point is equally suitable for processes from which the hydrogen peroxide is to be recovered free of water.

The tetrasubstituted ureas themselves are liquid or solid. If the substituted urea is added only as the hydroquinone solvent it can be solid. It must be soluble in the concomitant used quinone solvent. If the substituted urea, however, is used as both the quinone and the hydroquinone solvent, naturally it must be liquid.

The stability of the substituted ureas is unexpectedly high against alkaline acting materials as, for example, alkali hydroxide, e.g., sodium hydroxide and potassium hydroxide, alkaline earth hydroxides, e.g., calcium hydroxide and barium hydroxide, alkali silicate, e.g., sodium silicate, basic balanced alkaline earth silicates, ammonia, amines, quaternary ammonium bases and basic ion exchangers (anion exchangers). For example, when N,N-diethyl-N',N'-di-n-butyl urea was boiled for 12 hours with ethanolic caustic potash less than 0.5% of the substituted urea was destroyed.

Likewise the thermal resistance of the substituted ureas is very high. After four weeks treatment at 100° C. N,N-diethyl-N',N'-di-n-butyl urea contained less than 1% decomposition products.

Finally, it should be mentioned that the hydrogenation is extraordinarily favored by the weakly basic acting substituted urea, i.e., the hydrogenation is accelerated.

In Table II there are given the physical properties of N,N-diethyl-N',N'-di-n-butyl urea.

TABLE II

| | |
|---|---|
| Density | 0.892 |
| Viscosity cps | 7.322 |
| B.P.$_{12}$ ° C. | 137–138 |
| B.P.$_{760}$ ° C. | 265–268 |
| Solubility in water percent | <0.1 |
| Solubility of water in the substituted urea percent | 1.7 |
| Solubility of 2-ethyl anthraquinone (20° C.) g./liter | [1] 68–70 |
| Solubility of 2-ethyl tetrahydro anthraquinone (20° C.) g./liter | [1] 60–63 |
| Solubility of 2-ethyl anthraquinone in a mixture of 70 parts trimethyl benzene and 30 parts of the substituted urea (20° C.) g./liter | 160–165 |
| Solubility of 2-ethyl anthrahydroquinone in a mixture of 70 parts trimethyl benzene and 30 parts of the substituted urea (45° C.) g./liter | 120–130 |
| Yield of hydrogen peroxide do | 16/17 |

[1] In the pure material.

From Table II it is evident that not only the hydroquinone solubility of 120–130 g./liter is almost double as high as with several trisubstituted phosphoric acid esters, in which, for example, in a mixture of 75 volume percent trimethyl benzene and 25 volume percent trioctyl phosphate the hydroquinone solubility amounts to only 64 g./liter at the same temperature, but that by the increased solubility the hydrogen peroxide yield is also increased around 100% to 16–17 g./liter. This yield is obtained immediately by a suitable combination of the selected substituted urea with the appropriate quinone solvent. As quinone solvents here can be employed the known materials such as those set forth above for example.

The proportions of quinone to hydroquinone solvent can vary within relatively wide limits, e.g., 0 to 85% by volume quinone solvent and 15 to 100% by volume hydroquinone solvent. Besides there can be added to the mixture still other solvents and/or inert materials. A volume ratio of quinone solvent to hydroquinone solvent of about 60–85 to 40–15 has proven especially suitable.

As quinone solvents trialkyl substituted benzenes, e.g., 1,2,3-trimethyl benzene, 1,2,4-trimethyl benzene, mesitylene, 1,3,5-triethyl benzene, and methyl naphthalenes, e.g., 1-methyl naphthalene, 1-ethyl naphthalene, 2-methyl naphthalene and 1,2-dimethyl naphthalene are especially approved and as the hydroquinone solvent there is preferably used N,N-diethyl-N',N'-di-n-butyl urea or tetramethyl urea. Tetramethyl urea can even be employed without a quinone solvent. In such a case the hydrogen peroxide can be recovered by a stripping distillation.

As reaction carriers there can be used all of the known alkyl anthraquinones, anthraquinone carboxylic acid esters, anthraquinone sulfonic acid esters and halogen anthraquinones with the named substituted ureas alone or in combination with other quinone solvents. In addition to the alkyl anthraquinones mentioned above, for example, there can be used anthraquinone carboxylic acid esters such as the methyl ester of anthraquinone 2-carboxylic acid, the ethyl ester of anthraquinone 5-carboxylic acid; anthraquinone sulfonic acid esters such as the methyl ester of anthraquinone 1-sulfonic acid, the ethyl ester of anthraquinone 2-sulfonic acid, the dipropyl ester of anthraquinone 1,8-disulfonic acid. The reaction carriers can be used with the substituted ureas alone or in combination with other quinone solvents.

The technical advantage of the solvents of the invention is primarily, as explained above, in their increased solubility for anthrahydroquinone and accompanying this a substantially increased yield of hydrogen peroxide, additionally in their high resistance to alkali and temperature which permits a long lasting operation. These advantages are combined with favorable boiling point, ignition point, density and viscosity properties.

Unless otherwise indicated, all proportions and percentages are by weight.

Example 1

There were dissolved in a solvent mixture consisting of 70 parts by volume of an industrial alkyl benzene having a boiling range under normal pressure of 200 to 220° C. and 30 parts by volume of N,N-diethyl-N',N'-di-n-butyl urea, 160 grams of 2-ethyl anthraquinone per liter of solution and gassed with so much hydrogen at 45–50° C. in the presence of a palladium catalyst that the anthraquinone present was 75% hydrogenated. After oxidation with an oxygen containing gas, e.g., air, the working solution contained 16.2 grams of hydrogen peroxide per liter which was scrubbed with water in an extraction column. The organic phase was returned to the hydrogenation step.

Example 2

There were dissolved in a solvent mixture consisting of 70 parts by volume of an industrial desulfurized methyl naphthalene and 30 parts by volume of N,N-diethyl-N',N'-di-n-butyl urea 160 grams per liter of 2-ethyl anthraquinone and gassed with hydrogen at 45–50° C. in the presence of a palladium catalyst until 95% of the anthraquinones were hydrogenated. After oxidation with an oxygen containing gas (air) the working solution contained 20.5 grams of hydrogen peroxide per liter which was removed by a stripping distillation with n-propyl acetate in the manner set forth in the aforementioned Schreyer et al. U.S. patent application. The working solution freed from the hydrogen peroxide was returned to the hydrogenation step.

Example 3

240 grams of 2-ethyl anthraquinone were dissolved in a liter of tetramethyl urea and hydrogenated 100% with hydrogen at 45–50° C. in the presence of a palladium catalyst. After oxidation with an oxygen containing gas (air) the working solution contained 32 grams of hydrogen peroxide per liter, that was removed with the help of a stripping distillation with tert. butyl acetate. The anthraquinone solution freed from the hydrogen peroxide was returned again to the hydrogenation step.

Example 4

140 grams of 2-ethyl anthraquinone were dissolved in one liter of a solvent mixture consisting of 70 parts by volume of an industrial alkyl benzene and 30 parts by volume of N,N-dimethyl-N′,N′-dicyclohexyl urea and gassed with hydrogen at 40–50° C. until 90% of the anthraquinone was hydrogenated. After oxidation with an oxygen containing gas (air) the working solution contained 16.8 grams of hydrogen peroxide per liter which could be removed with the help of a stripping distillation or by extraction with water. The solution freed from hydrogen peroxide was returned to the hydrogenation step.

N,N-diethyl-N′,N′-di-n-butyl urea was produced in the following manner:

1.09 kg. of phosgene (11 moles) were introduced from a bomb at −5 to −10° C. into about 5 liters of toluene and 2.58 kg. (20 moles) of di-n-butyl amine added dropwise at the same temperature. After filtering off the di-n-butyl amine hydrochloride with suction the di-n-butyl carbamoyl chloride in the filtrate was reacted with 1.606 kg. (22 moles) of diethyl amine at room temperature. The temperature rose to 70–75° C., after cooling, the diethyl amine hydrochloride was filtered off with suction and washed with 1 liter of toluene. The combined filtrates were washed 3 to 5 times with water and then the toluene distilled off. The residue was distilled on a small packed column B.P.$_{15}$ 141° C., yield 2.075 kg. (91% of theory).

In place of using excess amine which can be regenerated with soda lye there can also be employed directly the corresponding amount of alkali hydroxide, e.g., sodium hydroxide or potassium hydroxide.

The other tetra substituted ureas which are new also can be made in the manner just described, or in the manner of making known tetrasubstituted ureas such as tetramethyl urea and tetraethyl urea.

What is claimed is:

1. In a process for the production of hydrogen peroxide by the anthraquinone process including the reduction in a solvent of substituted anthraquinone as the reaction carrier, subsequent oxidation thereof, removal of the hydrogen peroxide formed and return of the rejuvenated reaction carrier to the reduction step the improvement comprising employing as the solvent for the reaction carrier a tetra substituted urea of the formula

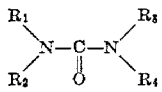

where $R_1$, $R_2$, $R_3$ and $R_4$ independently are selected from the group consisting of alkyl of 1–12 carbon atoms, cyclohexyl, methyl cyclohexyl and $OR_5$ where $R_5$ is alkyl of 1 to 12 carbon atoms, $R_1$ and $R_2$ together are joined to form with the urea nitrogen atom a member of the group consisting of a morpholine ring, a piperidine ring, a thiomorpholine ring and an oxazolidine ring and $R_3$ and $R_4$ together are as defined in $R_1$ and $R_2$ together.

2. A process according to claim 1, wherein $R_1$, $R_2$, $R_3$ and $R_4$ individually are selected from the group consisting of (a) alkyl of 1 to 5 carbon atoms, (b) $OR_5$ where $R_5$ is alkyl of 1 to 3 carbon atoms, (c) cyclohexyl, and (d) methyl cyclohexyl and $R_1$ and $R_2$ together are joined to form with the urea nitrogen atom a member of the group consisting of a morpholine ring and an oxazolidine ring and $R_3$ and $R_4$ are not joined together.

3. A process according to claim 1 wherein the substituted urea is a tetra alkyl urea.

4. A process according to claim 3 wherein $R_1$ and $R_2$ are alkyl of 1 to 3 carbon atoms and $R_3$ and $R_4$ are alkyl of 1 to 5 carbon atoms.

5. A process according to claim 4 wherein the substituted urea is tetramethyl urea.

6. A process according to claim 4 wherein the substituted urea is N,N-diethyl-N′,N′-di-n-butyl urea.

7. A process according to claim 1 wherein the substituted urea is N–1 to 3 carbon atom alkoxy 1 to 5 carbon atom alkyl N,N′,N′-tri 1 to 5 carbon atom alkyl urea, 8. A process according to claim 1 wherein the substituted urea is N-cyclohexyl having up to 1 methyl substituent-N,N′,N′-tri 1 to 5 carbon atom alkyl urea.

9. A process according to claim 1 wherein the substituted urea is N,N′- di 1 to 5 carbon atom alkyl carbamoyl-N′-1-morpholine.

10. A process according to claim 1 wherein the substituted urea is a liquid and is the sole quinone and hydroquinone dissolver employed.

11. A process according to claim 10 wherein in addition to the substituted urea there is also employed an aromatic hydrocarbon as a quinone solvent.

12. A process according to claim 11 wherein the aromatic hydrocarbon is selected from the group consisting of alkyl benzene and alkyl naphthalene and is used in a voluent N,N′,N′-tri 1 to 5 carbon atom alkyl urea.

13. A process according to claim 12 where the volume ratio of aromatic hydrocarbon to substituted urea is 60–85 to 40–15.

14. A process according to claim 12 wherein the substituted urea is N,N-diethyl-N′,N′-di-n-butyl urea.

15. A process according to claim 1 wherein the hydrogen peroxide is removed by stripping distillation with an organic solvent.

16. A process according to claim 1 wherein the hydrogen peroxide is removed by extraction with water.

17. A process according to claim 16 wherein the hydrogen peroxide is removed by stripping distillation under reduced pressure using as the stripping agent vapors of an organic solvent having a boiling point up to about 160° C.

References Cited

UNITED STATES PATENTS

| | | | |
|---|---|---|---|
| 2,886,416 | 5/1959 | Cox et al. | 23—207 |
| 3,277,061 | 10/1966 | Fenton | 260—553 R |
| 3,428,423 | 2/1969 | Egbert | 159—16 R |
| 2,668,758 | 2/1954 | Roos et al. | 260—553 R |
| 3,663,614 | 5/1972 | Rennells | 260—553 R |

FOREIGN PATENTS

| | | | |
|---|---|---|---|
| 502,459 | 3/1939 | Great Britain | 23—207 |

EDWARD J. MEROS, Primary Examiner

H. S. MILLER, Assistant Examiner

U.S. Cl. X.R.

260—369

UNITED STATES PATENT OFFICE
CERTIFICATE OF CORRECTION

Patent No. 3,767,778  Dated October 23, 1973

Inventor(s) Gunter Giesselmann, Gerd Schreyer and Wolfgang Weigert

It is certified that error appears in the above-identified patent and that said Letters Patent are hereby corrected as shown below:

Claim 12, line 4, should read:

"ume amount in excess of the substituted urea."

Signed and Sealed this ninth Day of March 1976

[SEAL]

Attest:

RUTH C. MASON
*Attesting Officer*

C. MARSHALL DANN
*Commissioner of Patents and Trademarks*